J. H. THOMAS.
Bee Hive.
No. 66,415. Patented July 2, 1867.
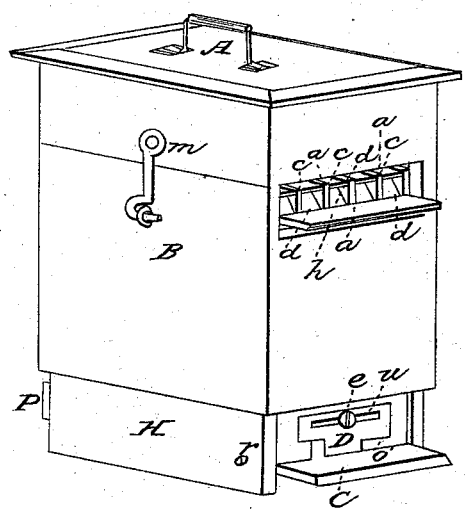
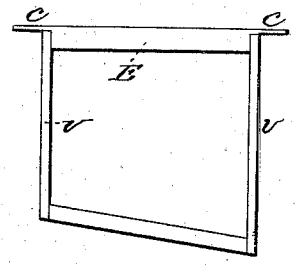
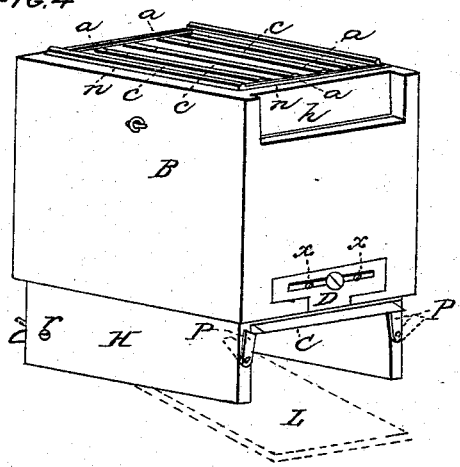
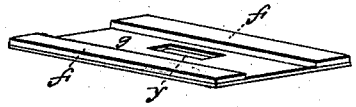
WITNESSES:
L. M. Newton
James Chase
INVENTOR:
John Hopkins Thomas

United States Patent Office.

JOHN HOPKINS THOMAS, OF ROCHESTER, NEW YORK.

Letters Patent No. 66,415, dated July 2, 1867.

IMPROVEMENT IN BEE-HIVES.

*The Schedule referred to in these Letters Patent and making part of the same.*

TO ALL WHOM IT MAY CONCERN:

Be it known that I, JOHN HOPKINS THOMAS, of Rochester, in the county of Monroe, in the State of New York, have invented a new and useful Improved Bee-Hive; and I do hereby declare that the following is a full and exact description thereof, reference being had to the accompanying drawings, and to the letters of reference marked thereon.

The nature of my invention consists in giving increased facilities for bees to work, while the apiarian may have many advantages not obtained in other constructions, for hiving bees, making observations, and cleaning the hives in the least possible time, with little or no disturbance to the bees; also by giving an under ventilation from front to rear, instead of an upward ventilation, which is so injurious to the brood.

To enable others skilled in the art to make and use my invention, I will proceed to describe its construction and operation.

I construct my hives with hollow walls, movable comb-frames, and honey-board; also with entrance in front and rear.

Figure 1 is a perspective view.
Figure 2, a detached section of wall.
Figure 3, side view.
Figure 4 is a perspective and rear view, with top removed.
Figure 5 is a perspective view of honey-board.

A represents a cover, which closes upon the double walls or body of the hive by means of shoulders or a water-table, as shown at $n\ n$, (fig. 4,) thereby rendering the hive entirely water-proof. I construct the walls in the manner shown in fig. 2, in which F F′ represent the walls, and $s\ s$ the cleats, so that a dead-air space of about one inch is left for the purpose of more effectually shielding the colony from heat in summer and cold in winter. $h$ represents a narrow strip, which turns upon pivot pins or screws, which set through the walls of the hive and are inserted into the ends of the band, for the purpose of instantly turning it down to gain access to the flat projecting ends of the comb-frames $c\ c\ c$, which rest upon the bevelled bearings $d\ d\ d$. These bearings are provided with upright projecting stops, $a\ a\ a$, which fill the space between the comb-frames, so that no chance is left for the grubs to crawl in and spin their cocoons, as in other hives. The rear part of the hive is provided with the same, and when closed, as shown at $h$, (fig. 4,) serves, by the use of the shoulder $n$, to form an endless water-table, upon which rests the cover A. The bevelled bearings $d\ d\ d$ are also brought to a sharp edge, to prevent the bees from gluing the comb-frames fast. They are also formed in the inner wall, and when the operator turns the bands $h\ h$ down, the fingers may be inserted underneath the flat projecting ends of the comb-frames $c\ c\ c$ without any fear of coming in contact with the bees. D represents a sliding-gauge, which I introduce both in front and rear, for the purpose of producing an under ventilation from front to rear, instead of an upward ventilation, which has proved so injurious to the brood, and at the same time giving the bees the same facilities to prevent robbing that they otherwise would have by the use of one gauge. I construct my gauges with a long slot, $u$, through which passes the screw $e$. I also remove a piece at one corner sufficiently wide for the drones and queen to pass through, while at the other corner I prepare an opening only sufficient for the working bees to pass through, so that by sliding it one way the larger opening $o$ is presented, and sliding it the other way, the smaller opening $o'$ is presented, leaving only room for the working bees to pass, as above referred to, and when set in the centre the aperture is closed, as represented in fig. 4. C represents a bottom board, the front end of which is suspended by the pivot-screws $r\ r$, (as shown in figs. 1 and 4,) and the rear end resting upon the buttons P P, which are made to turn back and allow the bottom board to drop down, as represented by the red lines L, for the purpose of making observations, cleaning the hives, and hiving the bees. $i\ i$ represent two elevated strips, which are used to guide and adjust the honey-board $g$ (fig. 5) as it is made to slide on from one side in order to crowd the bees from its bearing without killing them. $ff$ represent two pieces attached to the outer edges to prevent warping. $y$ shows an aperture, over which may be placed the honey-boxes, which are not necessarily shown in the drawing, fig. 3. E shows the form of the comb-frames, with flat projecting ends $c\ c$. The top piece E, I make in a wedge form, being bevelled from the surface to the base.

What I claim as my invention, and desire to secure by Letters Patent, is—

1. The use of the bevelled bearings $d\ d\ d$, in combination with the upright projecting stops $a\ a\ a$, constructed in the manner and for the purpose herein set forth.

2. The use of the back entrance, in combination with the sliding-gauge, for the purpose herein set forth.

JOHN HOPKINS THOMAS.

Witnesses:
L. M. NEWTON,
JAMES CHASE.